United States Patent [19]

Meline

[11] Patent Number: 5,119,569
[45] Date of Patent: Jun. 9, 1992

[54] MULTIPLE GAGE LENGTH EXTENSOMETER

[75] Inventor: Harry R. Meline, Minnetonka, Minn.

[73] Assignee: MTS Systems Corporation, Minneapolis, Minn.

[21] Appl. No.: 675,998

[22] Filed: Mar. 26, 1991

[51] Int. Cl.$^5$ .............................. G01N 3/04
[52] U.S. Cl. .................................... 33/790
[58] Field of Search .......... 33/787, 788, 789, 790; 73/856, 860, 831, 833

[56] References Cited

U.S. PATENT DOCUMENTS 3,789,508 2/1974 Meline .
4,507,871 4/1985 Meyer et al. .
4,831,882 5/1989 Meline et al. .

OTHER PUBLICATIONS

Product Specification Model Series 632.15, MTS Sysems Corporation, Pub. date 1978, 2 pages.
MTS Drawing No. 417692-XX, admitted prior art.
MTS Drawing No. 8068445-XX, admitted prior art.
MTS Drawing No. B068446-XX, admitted prior art.
MTS Drawing No. 157353-XX, admitted prior art.

Primary Examiner—Harry N. Haroian
Attorney, Agent, or Firm—Kinney & Lange

[57] ABSTRACT

An extensometer for measuring strain in a specimen on which the extensometer is mounted which has two arms joined together at first ends, and with specimen engaging knife edges at the second ends. The knife edges will engage a specimen at spaced locations, so that when the specimen is subjected to a load, the knife edges will separate, and the amount of separation will be an indication of the strain in the specimen. The distance between the knife edges is known as the "gage length" and the present invention relates to providing for mounting the knife edge contact points in a selected plurality of positions in which the gage length of the extensometer is changed from other of the positions of the knife edges.

10 Claims, 4 Drawing Sheets

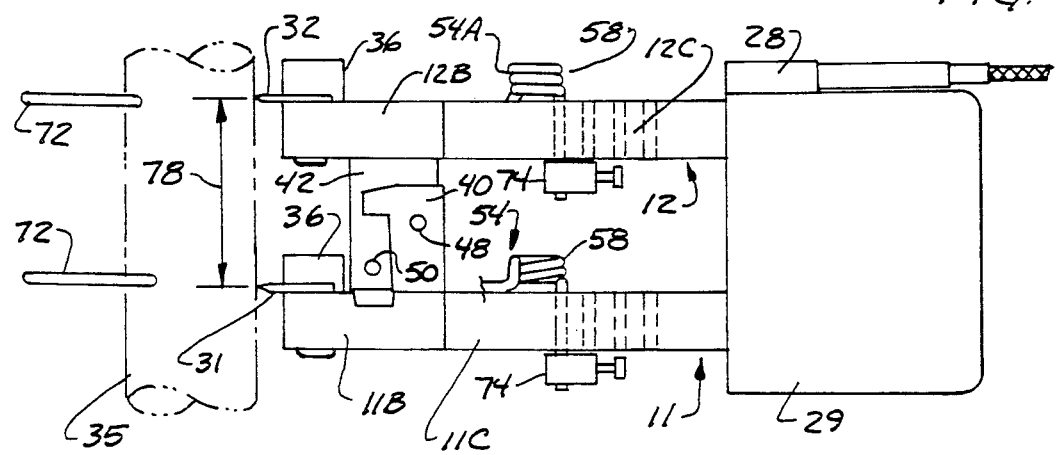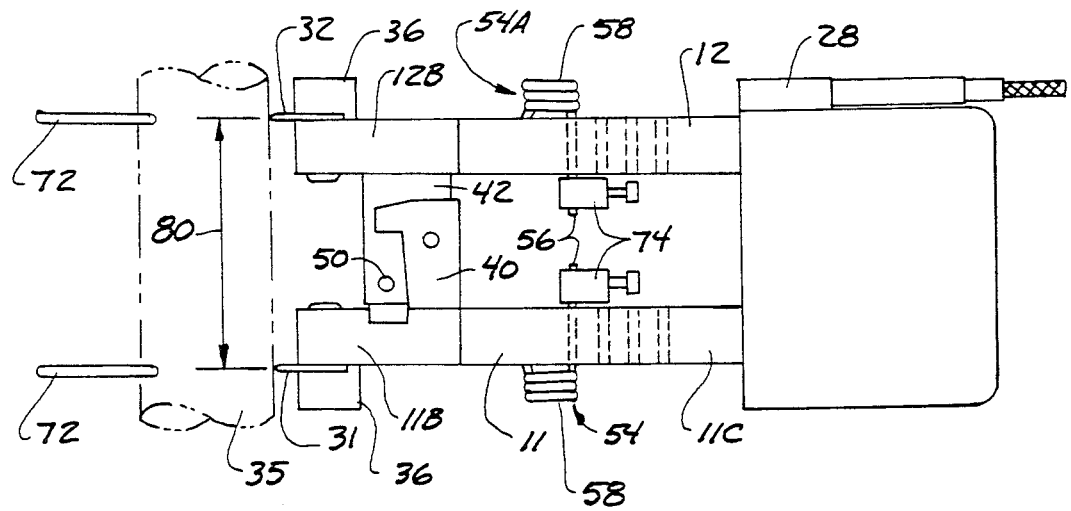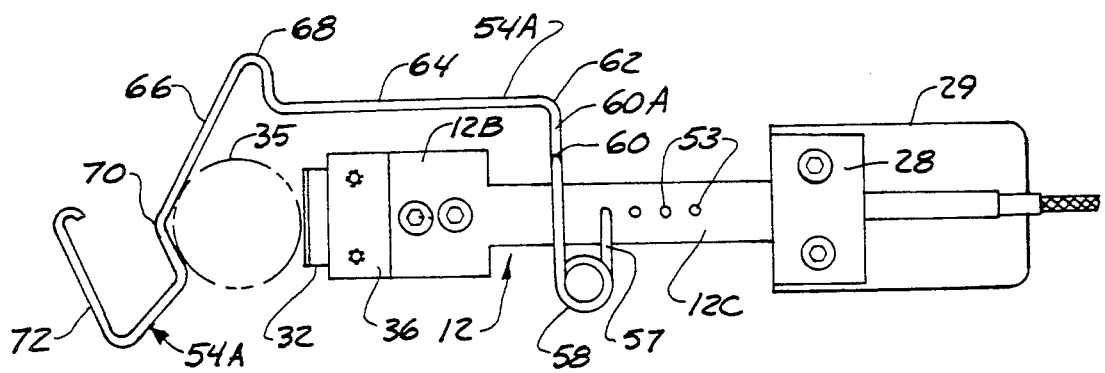

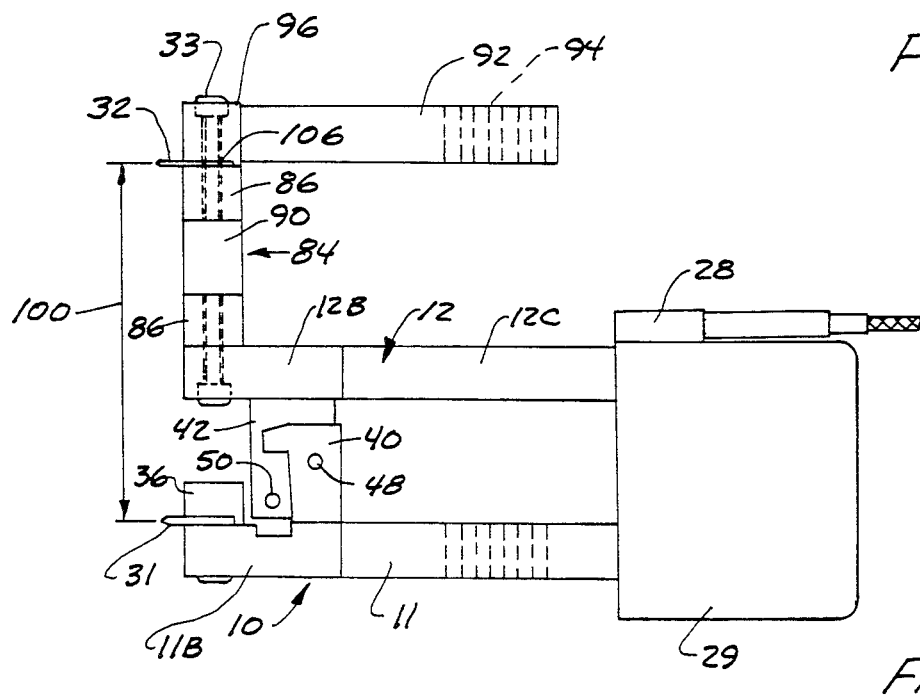
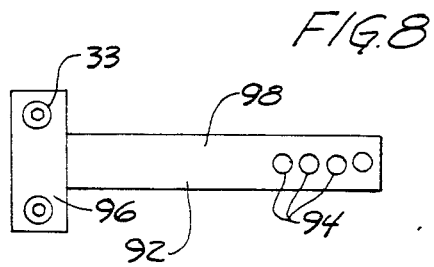
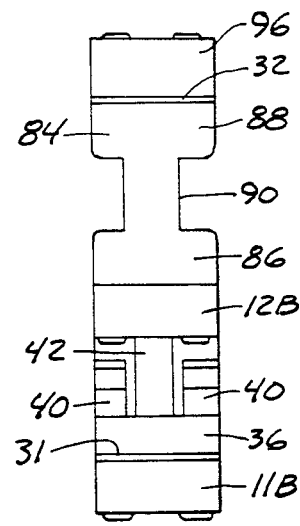
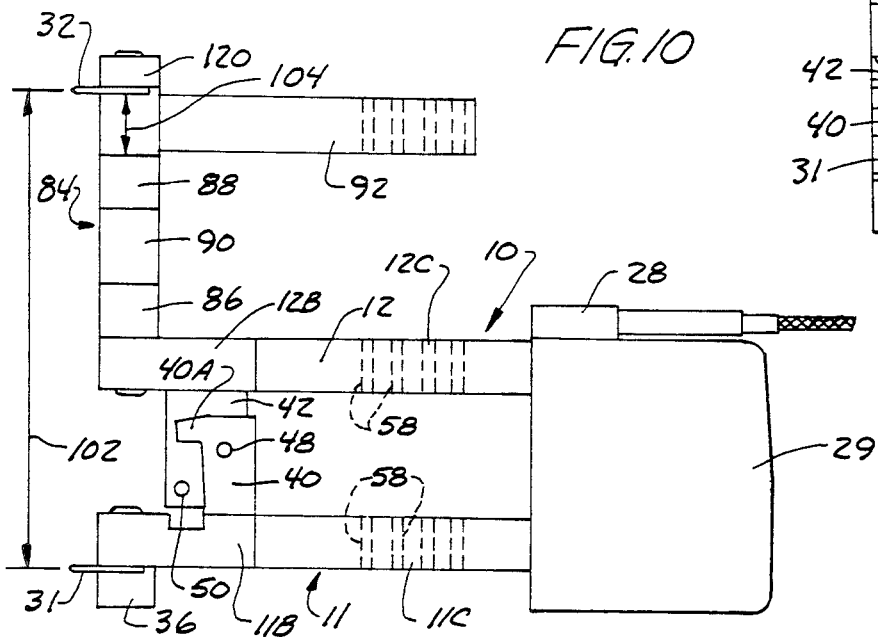

MULTIPLE GAGE LENGTH EXTENSOMETER

BACKGROUND OF THE INVENTION

The present invention relates to an extensometer that provides more than one gage length in a simple, reliable, and very accurate attachment sequence.

In the prior art, precision extensometers for determining the strain in specimens have been well known. For example, U.S. Pat. No. 3,789,508 illustrates a typical extensometer of the type disclosed herein. U.S. Pat. No. 4,507,871 shows low mass reliable attachment springs for attaching the extensometers to a specimen. MTS Systems Corporation, of Minneapolis Minnesota, the assignee of the present application, has sold gage length extenders for extensometers, but in systems wherein each individual extended gage length requires an entirely separate extender that is fastened on to the extensometer itself. The extensometer extenders such as the MTS Model Series 623.15 include separate members utilizing a base plate member and a top or head member which add mass, and also are relatively expensive to make.

Gage length de-extenders (shorteners) have been added to extensometers such as those shown in U.S. Pat. No. 3,789,508 to make the gage length shorter. Adapters are added to the extensometer arms between the specimen and the arm ends and thus the extensometer is moved farther from the central axis of the specimen than without the adapters. An undesirable moment is produced on the specimen and extensometer. The adapters also add mass. Added mass, and/or moments are undesirable when making dynamic strain measurements.

The spring mountings or attachment devices shown in U.S. Pat. No. 4,507,871, are desirable because they are light weight and provide a force that urges the specimen engagement knife edges against the specimen, with such force directly in alignment with the knife edges to prevent unwanted moments. With the deextenders used in the prior art, the spring attachments no longer were in line with the knife edge which produces an undesirable moment on the extensometer.

SUMMARY OF THE INVENTION

The present invention relates to an extensometer which is adapted to provide for a plurality of commonly used gage lengths, both shorter then normal and longer than normal. Either the metric system, or the English system can be accommodated with standard gage lengths being available through the incorporation of a kit that contains extra parts that provide for the desired gage length changes. The parts add only minimal additional mass or moments to the extensometer-specimen assembly. The extender parts are easily manufactured at a low cost.

Additionally, the extender kit parts that are used have the quick attachment spring that utilize the desirable characteristics of permitting the spring force to be aligned with the knife edges where they contact the specimen.

The extender parts are easily attached and precisely mounted, so that the gage length changes are very accurate, and can be done very quickly and efficiently in order to suit the user.

BRIEF DESCRIPTION OF THE DRAWINGS

FIG. 4 is a view of the extensometer of FIG. 1 showing knife edges in an alternate position from that shown in FIG. 1;

FIG. 5 is a side view of the extensometer of FIG. 1 showing the specimen engaging knife edges in a further alternate position;

FIG. 6 is a top plan view of the device of FIG. 5;

FIG. 7 is a side elevational view of an extensometer shown in FIG. 1 with a knife edge support and extender block in place thereon;

FIG. 8 is a top plan view of the device of FIG. 7 with parts removed;

FIG. 9 is a front elevational view of the device of FIG. 7;

FIG. 10 is a view on the device of FIG. 7 with the specimen engaging knife edges in a first alternate position;

DETAILED DESCRIPTION OF THE PREFERRED EMBODIMENTS

Figure 1:
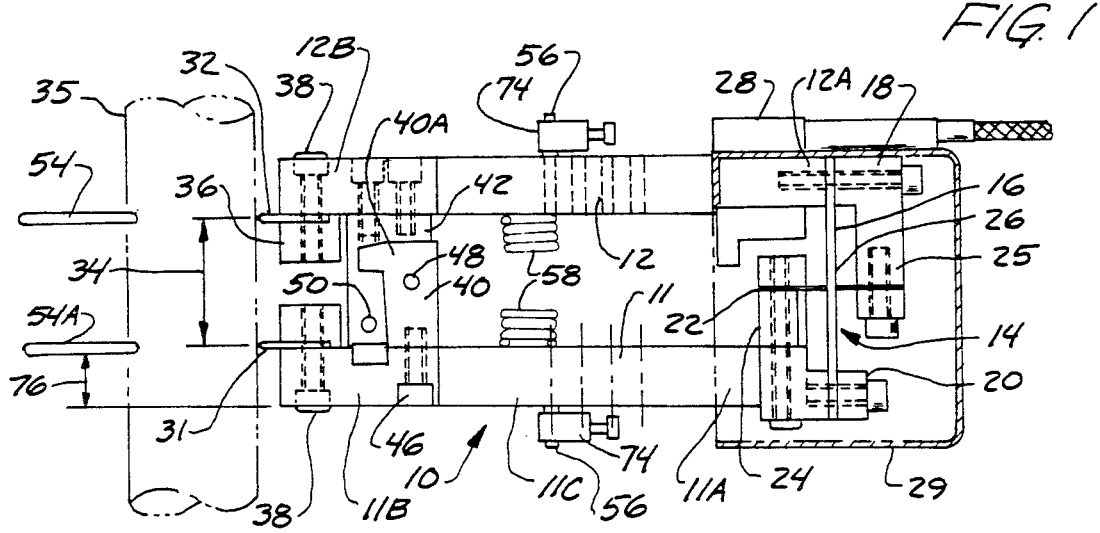
FIG. 1 is a side elevational view of a extensometer made according to the present invention with parts in section and parts broken away.

An extensometer body indicated generally at 10 is shown in FIG. 1, and comprises a first or lower arm 11, and a generally parallel upper arm 12. First outer ends 11A and 12A of the arms, 11 and 12, are coupled together with a cross flexure hinging arrangement indicated generally at 14, which is shown in U.S. Pat. No. 3,789,508, for example. The cross-flexure arrangement 14 includes a first cross flexure strap 16, that is coupled between the outer ends of the arms 11 and 12, with suitable mounting blocks 18 and 20, respectively. Flexure strap 16 has a plane perpendicular to the longitudinal axes of the arms 11 and 12. A second flexure strap 22, which passes through a provided opening in the flexure strap 16, is attached through an upright support block 24 to the outer end of arm 11A and through a depending portion 25 of the block 18 to the end of the arm 12. The second flexure strap 22 has a plane parallel to the longitudinal axes of arms 11 and 12 and thus perpendicular to strap 16. The outer ends of these arms 11 and 12 are thus hinged together for movement about a pivotal axis indicated at 26, where the flexure straps intersect.

Figure 2:
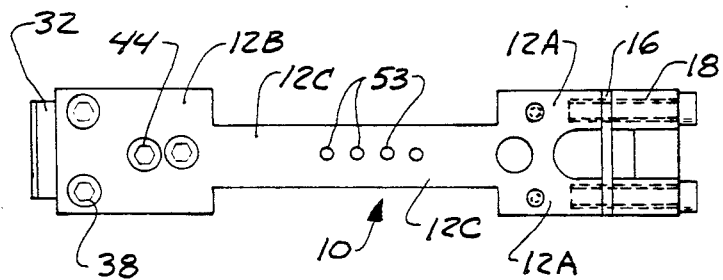
FIG. 2 is a top plan view of the extensometer of FIG. 1 with a spring attachment device removed.
Figure 3:
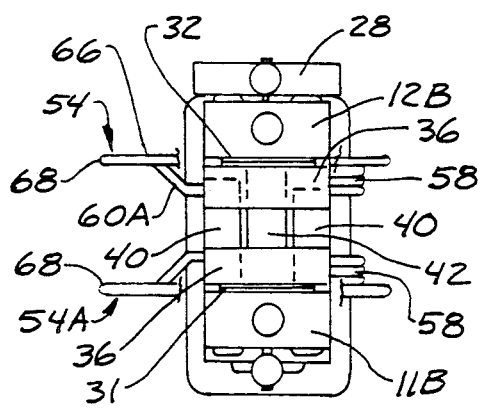
FIG. 3 is a front elevational view of the extensometer of FIG. 1.

Suitable strain gages (not shown) are mounted on the flexure strap 16 in a conventional manner and leads in a wiring hold down 28, are connected to suitable circuitry at a remote location. The amount of bending of the flexure members indicates that amount of movement of second or inner ends 11B and 12B of the arms 11 and 12. The flexure strap mounting is covered with a housing 29. The arms 11 and 12 include central arm portions 12C and 11C. The ends 11B and 12B are of a greater width than the arm portions 11C and 12C and the ends 11B and 12B support specimen engaging knife edges indicated generally at 31 and 32, respectively. The knife edges 31 and 32 shown in FIG. 2 are positioned on the facing surfaces of the arms and 12, and the spacing between these knife edges forms a gage length indicated at 34 which spaces the knife edges axially along its specimen indicated at 35, the desired distance. The knife edges 31 and 32 are flat blade like members that have edges which engage and are held in place on the arms with suitable mounting blocks 36, and cap screws 38.

A pair of upright guide members 40, are mounted on opposite edges of the end member 11B of arm 11, and extend upwardly toward arm 12 along the respective sides of a central guide member 42, that is mounted in the center of the end member 12B of arm 12. The guide member 42 is mounted with suitable cap screws 44 as shown in FIG. 2, and the side guide members 40 are mounted with cap screws indicated at 46. The side members 40 and center member 42 have openings 48 that will align when the extensometer is in a standard position. The aligning holes can be used to receive a pin to lock the extensometer arms together. This locking provides a standard gage length between the knife edge contacts. Also, a cross pin can be placed in the hole indicated at 50. The pin is carried on the center guide member 42, and will engage a stop lip 40A on each of the members 40, to prevent the second ends of the arms 11 and 12 from separating more than the desired amount.

Quick attachment springs indicated generally at 54 and 54A, respectively are used on the arms 11, and 12. These springs will provide a holding force to urge the knife edges against the specimen. The line of force is directly in line with , or in other words is co-planar with, the plane of knife edges 31 and 32. Each of the springs 54 is identical in construction but the mirror image of the other spring, but they are reversed in position relative to the respective arms, as shown in FIG. 1. The springs 54 and 54A each include a mounting shank 56, that extends through a respective aperture 53 in the arms 11 and 12. The shank 56 joins an offset length 57 that connects to a coil 58, of suitable size. The coil is offset from the arm by the length of the offset length 57. The coil is formed around an axis that is parallel to the mounting shank 56. As can be seen in FIG. 6, where the coil 58 of the illustrated spring 54 is oriented in a different position from that as shown in FIG. 1, a cross leg 60 leads from the coil back across the arm on which it is supported, and at a location where the cross leg clears the arm on which it is mounted a downwardly bent portion 60A is formed. A bend 62 is formed to provide a forwardly projecting leg 64. The leg 64 is parallel to and extends on a level with the knife edge with which it is used. Spring end portion 66 is formed at the end of leg 64 and provides a spring bend 68, and a specimen engaging bend 70, as well as a hand grip section 72.

As shown in FIG. 1, the arm 60 is bent so that with proper adjustment of an adjustment collar 74 on the ends of the shanks 56, the spring action plane defined by the arm 64, the spring bend 66, and specimen engaging portion 70, is aligned with the plane of the respective knife edges 31 and 32. By proper orientation of the spring quick attachment clamps, the attachment force from the springs will be in the same plane as the knife edge with which it is used to avoid adding unwanted moments to the extensometer through the action of the spring operated quick attachment clip.

The height of each of the arms 11 and 12 in axial direction of the specimen, or in other words measured in parallel direction to the gage length, is selected to be equal to each other and also selected to be a desired increment or fraction of the gage lengths desired in the plurality of gage lengths to be accommodated. For example in FIG. 1, if the gage length 34 is a first measurement unit, which is a minimum gage length, the height 76 of each of the arms 11 and 12 in vertical direction equals one-half of the minimum gage length 34, less the thickness of one knife edge, since the knife edge rests on the surfaces of the arm. As shown, the contact edge of the knife edge is centered on the knife edge thickness.

Referring to FIG. 4, it can be seen that the knife blade 32 has been repositioned to be on top (upper side) of the arm 12, so the gage length 78 in this knife blade position is $1\frac{1}{2}$ times the gage length 34. In FIG. 5 the knife edge 32, remains on top of the arm 12, and the knife edge 31 has been placed onto the lower surface of the arm 11 so that the gage length indicated at 80 is double the minimum gage length 34.

It should be noted in FIGS. 4 and 5 that the quick attach spring 54 for the configuration shown in FIG. 4 has been inverted and each exchanged for the other, that is, the top arm spring is put on the lower arm and the lower arm spring is placed on the top arm. The spring plane of action aligns with the plane of knife blade 32 but after inversion the shank 56 extends downwardly through an aperture 53 in the arm 12. In FIG. 5, both of the quick attachment springs 54 and 54A have been inverted and each exchanged for the other from their position in FIG. 1.

In FIG. 7, the extensometer body 10 is shown with a gage length extender 84 on the top of arm 12. The extender 84 is a generally I-shaped block as shown in FIG. 9, and has a pair of end members 86 and 88, and a center web 90 that joins the end members 86 and 88. The end member 86 is fastened with cap screws to the top surface of the arm 12 as shown. The end member 88 is used for supporting the knife edge 32.

A quick attach spring support member 92 for the extender is a T-shaped adapter (FIG. 8) having a head 96 and a body 98. It is used for clamping the knife edge 32 through the use of cap screws 33. The quick attach spring support member 92 is clamped to the tip end 88 of extender 84. The member 92 is a support for a quick attachment spring (which is not shown in FIG. 7). The spring may be used for quick attachment of the extensometer to a specimen in the same manner as that which was done in FIG. 1. A plurality of apertures 94 are provided in the body of member 92 for accommodating the shanks of different attachment springs.

In FIG. 7 the knife edges are shown set at a gage length indicated at 100 which is three times the minimum gage length 34, in the English system of measurement.

In FIG. 10 the knife edges 31 and 32 have been placed so that they are at a gage length indicated at 102, merely by utilizing attachment block 120 on top of the quick attachment spring support 92 to clamp knife edge 32 in place. The spring support 92 is an arm section that is similar to 11B and 11C or 12B and 12C of arms 11 and 12 respectively. The gage length 102 in the English measurement system is four times the minimum gage length 34 in this position because of the selection of the vertical height of the arm 11 and the vertical height 104 of quick attachment spring support 92. These parts have the effect of being the same vertical height measured in direction parallel to line of measurement of the gage length. Note that in FIG. 10, the quick attach spring support 92 has been inverted so that a recess, 106, for the knife edge 32, is now at the top of the quick attach spring support 92, in position to receive the clamp block 120. The knife edge is supported and clamped very solidly on the upper surface of the top member 88 of the extender 84.

Figure 11:
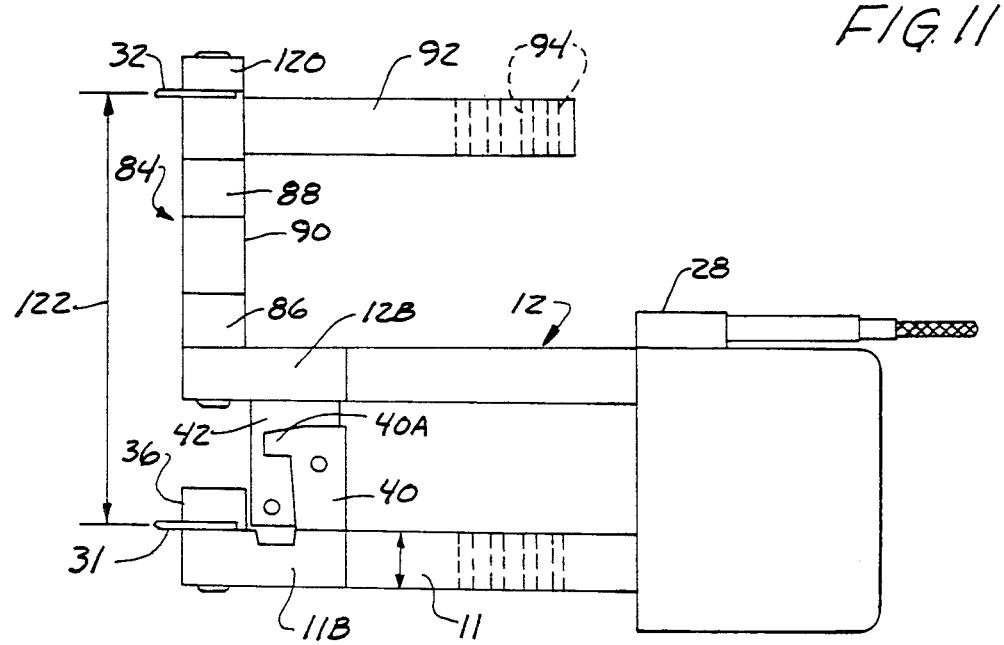
FIG. 11 is a side view of the device of FIG. 7 with the specimen engaging knife edges in a second alternative position; and, FIG. 12 is top plan view showing an attachment spring used for mounting the extensometer on to a flat specimen, and representing substantially the same view as FIG. 6.

In FIG. 11, the knife edge 31 has been placed on top of the arm 11 to provide a gage length indicated at 122. Gage length 122 is reduced from the maximum gage length 102 by the height dimension of the arm 11, plus the thickness of the knife edge (direction parallel to the axis of the specimen) provide a still further gage length selection.

In the English system, the gage length 34 is selected to be ½ inch; the gage length 78 is selected to be ¾ of an inch; the gage length 80 is selected to be 1 inch; the gage length 100 is 1½ inches; the gage length 102 is 2 inches; and the gage length 122 is 1¾ inches. The vertical height of the arms is ¼ inch, the selected increment of change of gage length less the thickness of the knife edge. In the metric system, gage length 34 is 10 mm; gage length 78 is 15 mm (the vertical height of the arms 11 and 12 is thus 5 mm less the thickness of the knife edge); the gage length 80 is selected to be 20 mm; the gage length 100 is selected to be either 40 mm or 25 mm, depending on the height of the extender 84. In the metric system two extender lengths of member 84 are provided. One is 15 mm longer than the other. The gage length 102 can be selected to be 50 mm or 35 mm using the extenders mentioned, respectively, and the gage length 122 is selected to be either 45 mm or 30 mm, with the respective extender height for the extender 84.

Figure 12:
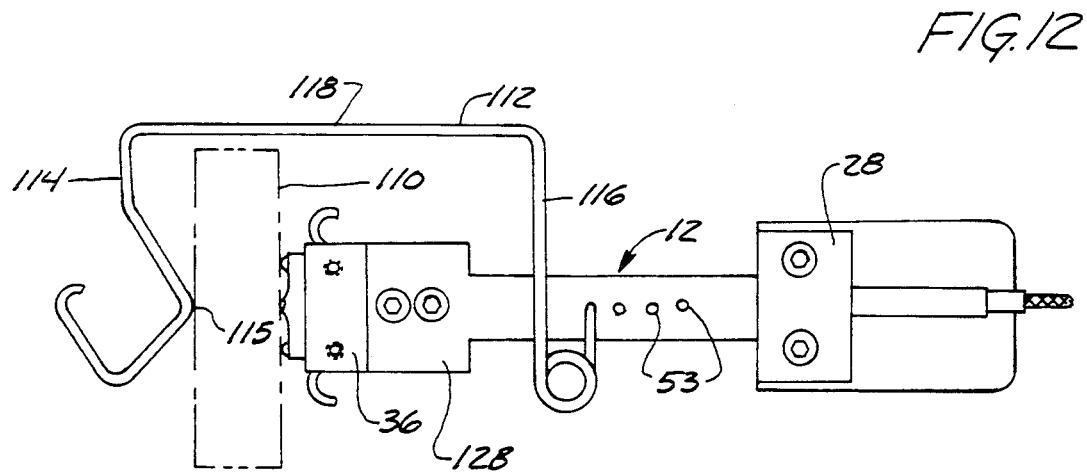

FIG. 12 shows a flat specimen 110 on which the extensometer is mounted. In this case a quick attach spring member 112 is mounted in one of the apertures of the upper extensometer arm 12, and its spring end 114 is formed to provide for a contact point 115 against one side surface of the flat specimen 110, rather than the two point contact provided for the quick attach member used with round cross section specimens. The spring arm shown at 116 is bent so that the plane defined by arm 118, and the specimen contact portion 114, remain coplaner with the plane of the adjacent knife edge.

The springs 54 and 112 are made so the plane of action lies essentially in line with either the top or bottom surfaces of the arms 11 or 12, or the support 92, so that the spring action planes are directly in line with the knife blades and the point or line of contact with the specimens. The knife blades can be replaced with extensometer contact pins which have points that engage a specimen.

Other types of springs for holding the extensometer in position may be used. Coil springs wrapped around the specimen and anchored on hooks on the extensometer arms are used in certain instances, but take longer to install properly.

Although the present invention has been described with reference to preferred embodiments, workers skilled in the art will recognize that changes may be made in form and detail without departing from the spirit and scope of the invention.

What is claimed is:

1. A strain measuring apparatus having a pair of arms with first and second ends, first ends of said arms being joined together for pivotal movement to permit the second ends of said arms to separate along an axis relative to each other, specimen engaging means at the second end of said arms for engaging a specimen at positions spaced along an axis of the specimen, said spacing along the axis of the specimen comprising a gage length, each of said arms having a height dimension parallel to the axis of the specimen and parallel to the direction of measurement of the gage length that when added to the thickness of specimen engaging means mounted on the respective arm is substantially equal to a selected fraction of the gage length with the specimen engaging means in a first position mounted on the surfaces of the arms which face each other, said arms being adapted to support the specimen engaging means on the opposite surfaces of the arms from the surfaces that face each other.

2. The apparatus as specified in claim 1 wherein each of the arms has means for mounting an attachment spring, and a resilient spring member that passes around a specimen engaged by the specimen engaging means and urges the specimen engaging means toward the specimen along a plane that is generally perpendicular to the specimen axis and passes through the contact points of the specimen engaging means and a specimen.

3. The apparatus of claim 1 including a kit comprising at least one extender part and one spring holder part, the extender part being adapted to be mounted onto an outer surface of one of said arms, and having an outer end for mounting the spring holder, and specimen engaging means selectively on an outer side of the spring holder part and between the outer end of the extender part and the spring holder part, the spring holder part having a height in direction of the axis of the specimen a selected fraction of the gage length.

4. The apparatus of claim 3 wherein the extender part and spring holder provide a combination that permits mounting the specimen engaging means at gage length ratios equal to 1.5, 2.0, 3.0, 3.5 and 4.0, relative to the first mentioned gage length.

5. The apparatus of claim 3 wherein the spring holder part has a height which is equal to the height dimension of the arms of the extensometer with the thickness of the specimen engaging means added to the arms.

6. The strain measuring apparatus of claim 1, including spring means for moving each of the specimen engaging means into engagement with a specimen against which the spring means are placed, said spring means comprising a mounting shank adapted for mounting in an aperture on each of the arms forming the extensometer, said spring means having a spring arm portion that is offset from the extensometer arm and extends to the opposite side of the specimen from the specimen engaging means to exert a spring force urging the specimen engaging means against the specimen, said spring arm portion being bent relative to said shank so that upon placement of the shank through an aperture on the arm with the spring arm portion selectively on one of the first surfaces of the arms and the opposite surfaces of the arms, respectively, the spring arm lies substantially in a plane perpendicular to a specimen loading axis and passing through as the point of contact between the specimen engaging means and a specimen.

7. A strain measuring apparatus having a strain sensing element with two arms extending to two specimen engaging contact members, comprising;
    means for mounting each of the two specimen contact members in at least two alternative positions on at least one of said arms; and attachment means on each of said arms for mounting attachment springs; and spring means for mounting in said attachment means, said spring means having a portion for engaging a specimen to be tested and urging the strain measuring apparatus and the specimen engaging members toward such specimen, said spring means being formed to provide a plane of force substantially perpendicular to the axis of such specimen and passing through the point of contact of the associated specimen engaging member and such specimen, said spring means being usable with the specimen engaging member in either of the two positions.

8. The strain measuring apparatus of claim 7 in which the one arm has a dimension between two oppositely facing surfaces measured substantially parallel to the axis of a specimen to be measured, said specimen engaging member being selectively mounted on one of said oppositely facing surfaces in its respective positions.

9. The apparatus as specified in claim 8 including an extender part that has surfaces adapted to be mounted on one of the oppositely facing surfaces of the one arm, and provide a mounting surface for a specimen engaging member spaced from said one oppositely facing surface of the one arm a selected distance correlated to the distance between the oppositely facing surfaces of the one arm, said extender part supporting a separate spring support arm for mounting an attachment spring means, said separate spring support arm having attachment means substantially identical to the attachment means on the first mentioned arms, said separate spring support arm having support oppositely facing surfaces for mounting a specimen engaging member selectively on each of the support oppositely facing surfaces, said spring support oppositely facing surfaces being spaced apart the same as the oppositely facing surfaces on said one arm with the thickness of the specimen engaging means added to said one arm.

10. The apparatus of claim 9 with said arms having a height dimension that permits mounting of said specimen engaging means and said spring mounting means at gage length ratios equal to 1.5, 2.0 and 2.5 relative to a first minimum gage length and at least one extender part for mounting on one arm that provides mounting the specimen engaging means on the extender part and the other arm at three different additional equal increments of gage length ratios for each additional extender part.

* * * * *